US011135997B2

(12) United States Patent
Shimazu et al.

(10) Patent No.: US 11,135,997 B2
(45) Date of Patent: Oct. 5, 2021

(54) BUCKLE DEVICE, SEAT MOUNTING STRUCTURE FOR BUCKLE DEVICE, AND VEHICLE SEAT BELT DEVICE

(71) Applicants:Toyota Jidosha Kabushiki Kaisha, Toyota (JP); Kabushiki Kaisha Tokai Rika Denki Seisakusho, Aichi (JP)

(72) Inventors: Katsuya Shimazu, Toyota (JP); Yoshio Mizuno, Aichi-ken (JP); Makoto Matsuzaki, Aichi-ken (JP)

(73) Assignees: Toyota Jidosha Kabushiki Kaisha, Toyota Aichi-ken (JP); Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 16/737,121

(22) Filed: Jan. 8, 2020

(65) Prior Publication Data

US 2020/0247352 A1    Aug. 6, 2020

(30) Foreign Application Priority Data

Feb. 4, 2019  (JP) .............................. JP2019-018267

(51) Int. Cl.
*B60R 22/26* (2006.01)
*B60R 22/28* (2006.01)
*B60R 22/18* (2006.01)

(52) U.S. Cl.
CPC .............. *B60R 22/28* (2013.01); *B60R 22/26* (2013.01); *B60R 2022/1806* (2013.01); *B60R 2022/1812* (2013.01); *B60R 2022/287* (2013.01)

(58) Field of Classification Search
CPC . B60R 22/26; B60R 22/28; B60R 2022/1806; B60R 2022/1812; B60R 2022/281; B60R 2022/286; B60R 2022/287
See application file for complete search history.

(56) References Cited

U.S. PATENT DOCUMENTS

| | | | | |
|---|---|---|---|---|
| 4,458,921 A | * | 7/1984 | Chiba ................. | B60R 22/1952 227/9 |
| 5,664,807 A | * | 9/1997 | Bohmler ............. | B60R 22/1952 280/805 |
| 5,908,219 A | * | 6/1999 | Bohmler ................. | B60R 22/26 297/216.1 |

(Continued)

FOREIGN PATENT DOCUMENTS

| | | | |
|---|---|---|---|
| DE | 102008052332 A1 | * 4/2010 | ............. B60R 22/18 |
| DE | 102013001375 A1 | 7/2014 | |

(Continued)

*Primary Examiner* — Ryan D Kwiecinski
(74) *Attorney, Agent, or Firm* — Dinsmore & Shohl LLP

(57) ABSTRACT

A buckle device includes: a buckle body to which a tongue portion mounted on a three-point seat belt is to be connected; a connecting member that is flexible and that has a first longitudinal end portion connected to the buckle body; and a force limiter mechanism including a take-up shaft around which a second longitudinal end portion of the connecting member is wound, the take-up shaft being supported below the buckle body in a vertical direction of a vehicle so as to be rotatable relative to a vehicle seat or a vehicle body, and an energy absorbing member that is deformed by rotation of the take-up shaft.

17 Claims, 13 Drawing Sheets

(56) References Cited

U.S. PATENT DOCUMENTS

| | | | | |
|---|---|---|---|---|
| 6,056,320 | A * | 5/2000 | Khalifa | B60R 22/28 |
| | | | | 280/805 |
| 6,302,346 | B1 * | 10/2001 | Brown | B60R 22/28 |
| | | | | 242/371 |
| 9,145,105 | B2 * | 9/2015 | Ohmura | B60R 22/18 |
| 9,527,472 | B2 * | 12/2016 | Shimazu | B60R 22/26 |
| 9,827,947 | B2 * | 11/2017 | Jaradi | B60R 22/18 |
| 10,118,588 | B2 * | 11/2018 | Shimizu | B60R 22/26 |
| 10,286,872 | B2 * | 5/2019 | Faruque | B60R 22/28 |
| 10,543,807 | B2 * | 1/2020 | Jaradi | B60R 22/1952 |
| 10,703,332 | B2 * | 7/2020 | Imanaka | B60R 22/44 |
| 2002/0113425 | A1 | 8/2002 | Betz et al. | |
| 2018/0319361 | A1 | 11/2018 | Faruque et al. | |
| 2019/0337482 | A1 * | 11/2019 | Grzic | B60R 22/1952 |
| 2020/0062149 | A1 * | 2/2020 | Sekizuka | B60R 22/1952 |

FOREIGN PATENT DOCUMENTS

| | | | | |
|---|---|---|---|---|
| DE | 102016015161 | A1 | 5/2017 | |
| EP | 1223087 | A1 * | 7/2002 | ......... A44B 11/2503 |
| FR | 2922483 | A1 * | 4/2009 | ............ B60R 22/22 |
| JP | H08268224 | A | 10/1996 | |
| JP | H1059126 | A | 3/1998 | |
| JP | H10100860 | A | 4/1998 | |
| JP | 2001-322531 | A | 11/2001 | |
| JP | 2001322531 | A * | 11/2001 | |
| JP | 2002-308047 | A | 10/2002 | |
| JP | 2003-515482 | A | 5/2003 | |
| JP | 2004-161037 | A | 6/2004 | |
| KR | 1019980060954 | A | 10/1998 | |
| WO | 0121454 | A1 | 3/2001 | |
| WO | WO-2010020422 | A1 * | 2/2010 | ............. B60R 22/28 |

\* cited by examiner

BUCKLE DEVICE, SEAT MOUNTING STRUCTURE FOR BUCKLE DEVICE, AND VEHICLE SEAT BELT DEVICE

CROSS-REFERENCE TO RELATED APPLICATIONS

This application claims priority to Japanese Patent Application No. 2019-018267 filed on Feb. 4, 2019, which is incorporated herein by reference in its entirety including the specification, drawings and abstract.

BACKGROUND

1. Technical Field

The disclosure relates to a buckle device, a seat mounting structure for the buckle device, and a vehicle seat belt device.

2. Description of Related Art

A buckle device described in Japanese Patent Application Publication No. 2001-322531 (JP 2001-322531 A) includes a buckle body into which a tongue portion of a seat belt is fitted and a shock absorption mechanism. The shock absorption mechanism is a pipe type force limiter mechanism having a cylindrical member such as a corrugated pipe. An end of a wire is connected to the shock absorption mechanism, and an intermediate portion of the wire is wound substantially in a U-shape around a winding portion of the buckle body. In case of a collision, an occupant of an automobile leans on the seat belt. When the forward moving force being applied to the buckle becomes a predetermined value or more, the cylindrical member such as a corrugated pipe is collapsed in its longitudinal direction, allowing the buckle body to move in the forward moving direction. Shock that is applied to the occupant is thus absorbed.

In a shock absorber for an automobile seat belt described in Japanese Patent Application Publication No. 10-100860 (JP 10-100860 A), a seat belt (webbing) has its one end connected to a buckle body and the other end connected to a load generating portion. The load generating portion is a pipe type force limiter mechanism including a cylindrical housing (cylindrical member), a chipper portion sealed in one opening of the cylindrical portion, and a wire extending through a through hole in the chipper portion. The chipper portion has a frictional resistance portion in the through hole, and the wire is temporarily fixed to the chipper portion by the frictional load between the wire and the frictional resistance portion. In this shock absorber, when an excessive tensile force is applied to the seat belt, the wire is pulled out by a predetermined length against the frictional load and the seat belt is loosened accordingly. Shock that is applied to an occupant is thus absorbed.

SUMMARY

In the pipe type force limiter mechanisms as described in the above related art, the cylindrical member tends to become longer in proportion to the displacement of the buckle body during shock absorption, namely the shock absorption stroke. Interference between the buckle device and floor-side components including a floor carpet is a problem when the buckle device including such a long force limiter mechanism is disposed in narrow clearance on the lateral side of a vehicle seat. Especially in vehicles in which electrical wires are routed from the floor tunnel side toward the vehicle seat side, the electrical wires, their covers, etc. are disposed between the floor tunnel and the vehicle sheet, which makes it difficult to secure a space for mounting such a buckle device as described above.

The disclosure provides a buckle device, a seat mounting structure for the buckle device, and a vehicle seat belt device, which improve mountability of the buckle device having a force limiter mechanism on vehicles.

A first aspect of the disclosure relates to a buckle device. The buckle device includes: a buckle body to which a tongue portion mounted on a three-point seat belt is to be connected; a connecting member that is flexible and that has a first longitudinal end portion connected to the buckle body; and a force limiter mechanism including a take-up shaft which is supported below the buckle body in a vertical direction of a vehicle so as to be rotatable relative to a vehicle seat or a vehicle body and around which a second longitudinal end portion of the connecting member is wound, and an energy absorbing member that is deformed by rotation of the take-up shaft.

According to the above configuration, in case of a collision of the vehicle, a load from an occupant trying to move inertially toward the front side of the vehicle is applied to the buckle body via the three-point seat belt and the tongue portion. The first longitudinal end portion of the flexible connecting member is connected to the buckle body. The second longitudinal end portion of the connecting member is wound around the take-up shaft of the force limiter mechanism. The take-up shaft is supported below the buckle body in the vertical direction of the vehicle so as to be rotatable relative to the vehicle seat or the vehicle body. When the take-up shaft is rotated by the above load, the second longitudinal end portion of the connecting member is pulled out from the take-up shaft and the buckle body is displaced in the direction in which the load is applied, so that the seat belt is loosened. At this time, the energy absorbing member of the force limiter mechanism is deformed. Shock applied from the seat belt to the occupant is thus absorbed.

In the above force limiter mechanism, the amount by which the connecting member is pulled out from the take-up shaft during shock absorption is equal to the displacement (shock absorption stroke) of the buckle body. That is, the amount by which the connecting member is wound around the take-up shaft in a normal state is equal to the shock absorption stroke. Accordingly, an increase in size of the force limiter mechanism which is associated with ensuring a sufficient shock absorption stroke is restrained as compared to a pipe type force limiter mechanism in which a cylindrical member becomes longer in proportion to the shock absorption stroke. The overall configuration of the buckle device having the force limiter mechanism is reduced in size as compared to conventional examples. The buckle device thus has improved mountability on vehicles.

In the first aspect, the energy absorbing member may be a torsion shaft that is torsionally deformed by rotation of the take-up shaft.

In the above configuration, the torsion shaft is torsionally deformed when the take-up shaft is rotated by the load applied from the occupant. Since the torsion shaft is torsionally deformed by the rotational force that acts on the take-up shaft, energy is efficiently absorbed by the small torsion shaft. This facilitates reduction in size of the buckle device.

In the first aspect, the torsion shaft may be coaxially disposed next to the take-up shaft in an axial direction.

In the above configuration, since the torsion shaft is coaxially disposed next to the take-up shaft in the axial direction, the diameter of the take-up shaft is reduced as compared to the case where, e.g., the torsion shaft is disposed coaxially in the take-up shaft. As a result, the thickness of the force limiter mechanism in a radial direction of the take-up shaft is reduced, which improves mountability of the buckle device in narrow clearance on the lateral side of the vehicle seat.

In the first aspect, the torsion shaft may be disposed in front of the take-up shaft in a longitudinal direction of the vehicle.

In the above configuration, the take-up shaft is supported below the buckle body in the vertical direction of the vehicle so as to be rotatable relative to the vehicle seat or the vehicle body, and the torsion shaft is disposed in front of the take-up shaft in the longitudinal direction of the vehicle. This configuration restrains degradation in mountability of the buckle device on vehicles due to, e.g., interference between the torsion shaft and a cover of a reclining mechanism disposed behind the take-up shaft in the longitudinal direction of the vehicle.

In the first aspect, the connecting member may be a strip-shaped member having a long strip shape.

In the above configuration, the first longitudinal end portion of the strip-shaped member that is the connecting member is connected to the buckle body, and the second longitudinal end portion of the strip-shaped member is wound around the take-up shaft of the force limiter mechanism. Since the strip-shaped member is flexible and has a long strip shape (e.g., a member similar to a seat belt), it is easily ensured that the strip-shaped member has resistance to bending, and the strip-shaped member can be wound around the take-up shaft with a smaller winding diameter, as compared to the case where the connecting member is a wire.

In the first aspect, the strip-shaped member may be made of a film material thinner than the three-point seat belt.

In the above configuration, the strip-shaped member whose second longitudinal end portion is wound about the take-up shaft is made of a film material thinner than the three-point seat belt. The strip-shaped member can thus be wound around the take-up shaft with an even smaller winding diameter. Further reduction in size of the buckle device is thus achieved.

In the first aspect, a length of the torsion shaft may be smaller than a lateral dimension of the strip-shaped member.

In the above configuration, since the length of the torsion shaft is smaller than the lateral dimension of the strip-shaped member, further reduction in size of the buckle device is achieved.

In the first aspect, the force limiter mechanism may include a gear train that transmits rotation of the take-up shaft to the torsion shaft.

In the above configuration, since the force limiter mechanism includes the gear train, the torsion shaft can be disposed on an axis other than the axis of the take-up shaft. Flexibility in positioning of the torsion shaft is thus improved.

In the first aspect, the gear train may be a spur gear train.

In the above configuration, rotation of the take-up shaft is transmitted to the torsion shaft via the spur gear train. In this case, for example, the torsion shaft can be disposed parallel to the take-up shaft.

In the first aspect, the gear train may be a bevel gear train.

In the above configuration, rotation of the take-up shaft is transmitted to the torsion shaft via the bevel gear train. In this case, for example, the torsion shaft can be disposed in a direction crossing (perpendicularly to) the take-up shaft.

A second aspect of the disclosure relates to a seat mounting structure for a buckle device. The seat mounting structure for a buckle device includes: a vehicle seat including a seat cushion connected to a vehicle body floor via a lifter mechanism and a slide mechanism, and a seatback connected to the seat cushion via a reclining mechanism; an anchor bracket fixed to a rear part of an upper rail included in the slide mechanism; and the buckle device of the first aspect in which the force limiter mechanism disposed in front of a cover of the reclining mechanism in the longitudinal direction of the vehicle is supported by the anchor bracket.

In the above configuration, the seat cushion of the vehicle seat is connected to the vehicle body floor via the lifter mechanism and the slide mechanism, and the seatback of the vehicle seat is connected to the seat cushion via the reclining mechanism. The anchor bracket is fixed to the rear part of the upper rail of the slide mechanism. The force limiter mechanism of the buckle device of the first aspect is supported by the anchor bracket. The force limiter mechanism is disposed in front of the cover of the reclining mechanism in the longitudinal direction of the vehicle. In the force limiter mechanism, the torsion shaft is disposed in front of the take-up shaft (on the opposite side from the cover) in the longitudinal direction of the vehicle. This configuration restrains degradation in mountability of the buckle device on vehicles due to interference between the torsion shaft and the cover that is displaced during operation of the lifter mechanism.

A third aspect of the disclosure relates to a vehicle seat belt device. The vehicle seat belt device includes: a three-point seat belt; a tongue portion mounted on the three-point seat belt; and the buckle device of the first aspect including the buckle body to which the tongue portion is to be connected.

In the above configuration, the tongue portion mounted on the tree-point seat belt is connected to the buckle body of the buckle device. Since this buckle device is the buckle device of the first aspect, this buckle device has the functions and effects described above.

As described above, the buckle device, the seat mounting structure for the buckle device, and the vehicle seat belt device according to the disclosure improve mountability of the buckle device having the force limiter mechanism on vehicles.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

Figure 1:
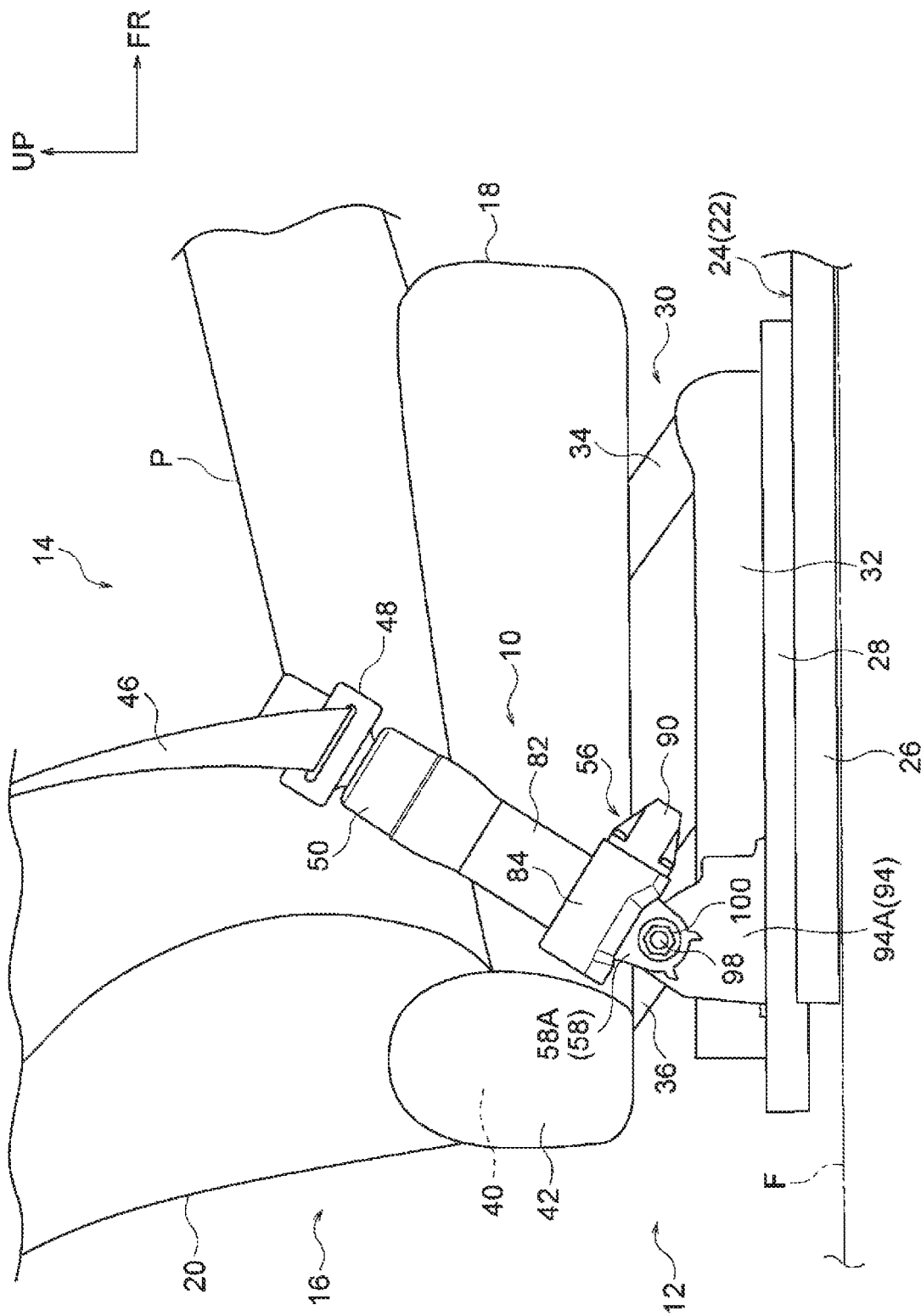
FIG. 1 is a side view illustrating an occupant wearing a seat belt of a vehicle seat belt device according to a first embodiment.

A buckle device 10, a seat mounting structure 12 for the buckle device, and a vehicle seat belt device 14 according to a first embodiment will be described with reference to FIGS. 1 to 9. Arrows FR, UP, and LH (OUT) shown as necessary in the figures indicate forward, upward, and leftward (outward in the lateral direction of a vehicle) of the vehicle, respectively. The front-rear, right-left, and up-down directions as used in the following description indicate the front and rear sides in the longitudinal direction of the vehicle, the right and left sides in the right-left direction of the vehicle (the lateral direction of the vehicle), and the upper and lower sides in the vertical direction of the vehicle unless otherwise specified. In the figures, a part of the reference characters is sometimes omitted for clarity.

Configuration

As shown in FIG. 1, the vehicle seat belt device 14 according to the first embodiment is a three-point seat belt device for restraining an occupant P sitting on a vehicle seat 16. The vehicle seat belt device 14 includes the buckle device 10 according to the first embodiment. The seat mounting structure 12 for the buckle device according to the first embodiment is applied to the buckle device 10, and the buckle device 10 is mounted on the vehicle seat 16.

The vehicle seat 16 is, e.g., a driver's seat of the vehicle and is located on the left side in the front part of a passenger compartment. The vehicle seat 16 includes a seat cushion 18 on which the occupant P is seated, a seatback 20 tiltably supported on the rear end of the seat cushion 18, and a headrest, not shown, supported on the upper end of the seatback 20 so that its height can be adjusted. The front-rear, right-left, and up-down directions of the vehicle seat 16 are the same as those of the vehicle. When the vehicle seat 16 is located on the right side in the front part of the passenger compartment, the vehicle seat 16 is configured symmetrically with the present embodiment.

A slide mechanism 22 for adjusting the position of the vehicle seat 16 in the longitudinal direction of the vehicle is disposed under the seat cushion 18. The slide mechanism 22 includes right and left slide rails 24 (the left slide rail 24 is not shown in the figure) and an electric actuator, not shown. Each of the right and left slide rails 24 includes a lower rail 26 and an upper rail 28. The lower rail 26 is fixed to a vehicle body floor F via a bracket, not shown, and the upper rail 28 is supported by the lower rail 26 so as to be slidable with respect to the lower rail 26 in the longitudinal direction of the vehicle. The lower rail 26 and the upper rail 28 have an elongated shape in the longitudinal direction of the vehicle. The slide mechanism 22 is configured to slide the upper rail 28 with respect to the lower rail 26 in the longitudinal direction of the vehicle by the driving force of the electric actuator.

Figure 3:
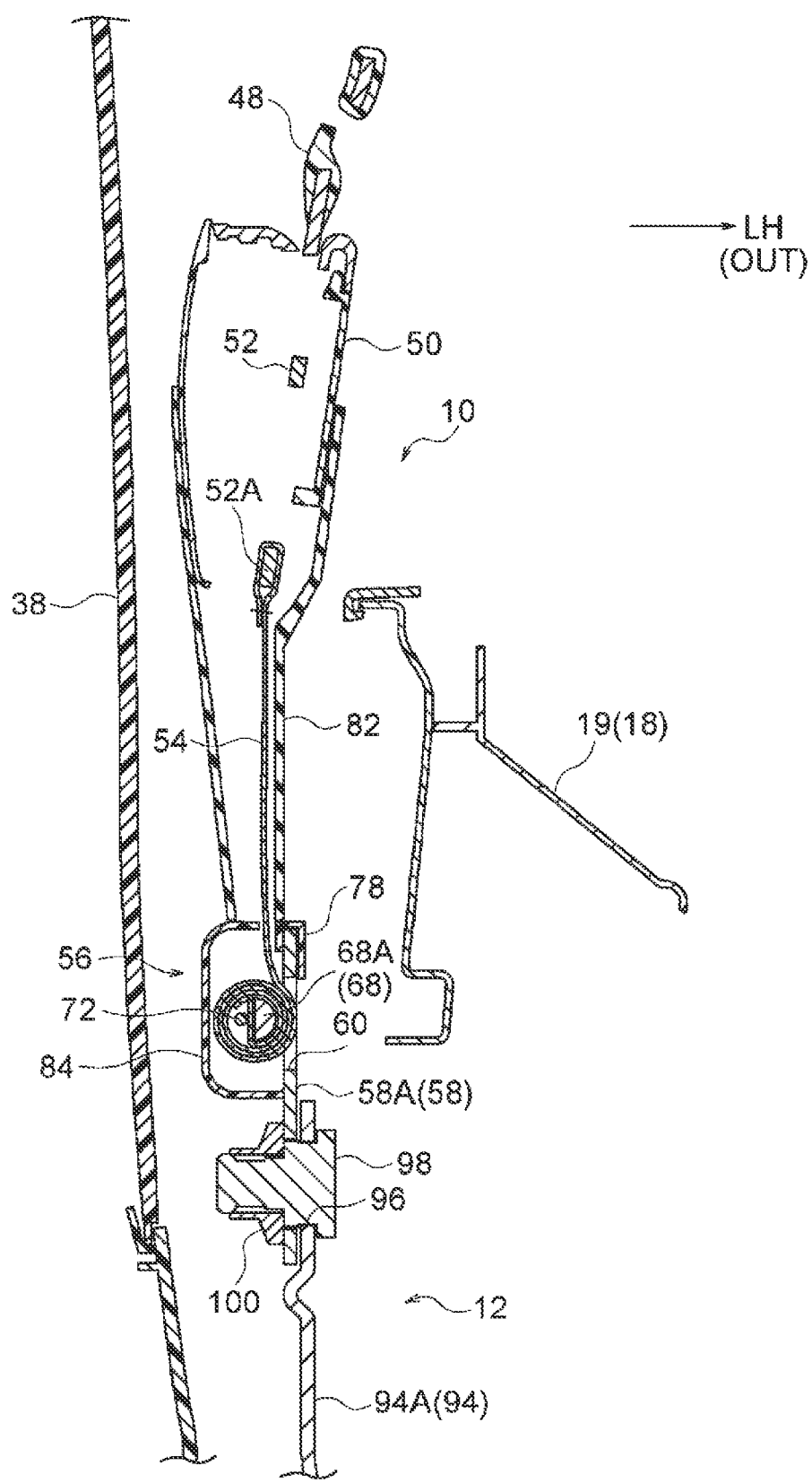
FIG. 3 is an enlarged sectional view taken along line III-III in FIG. 2.
Figure 4:
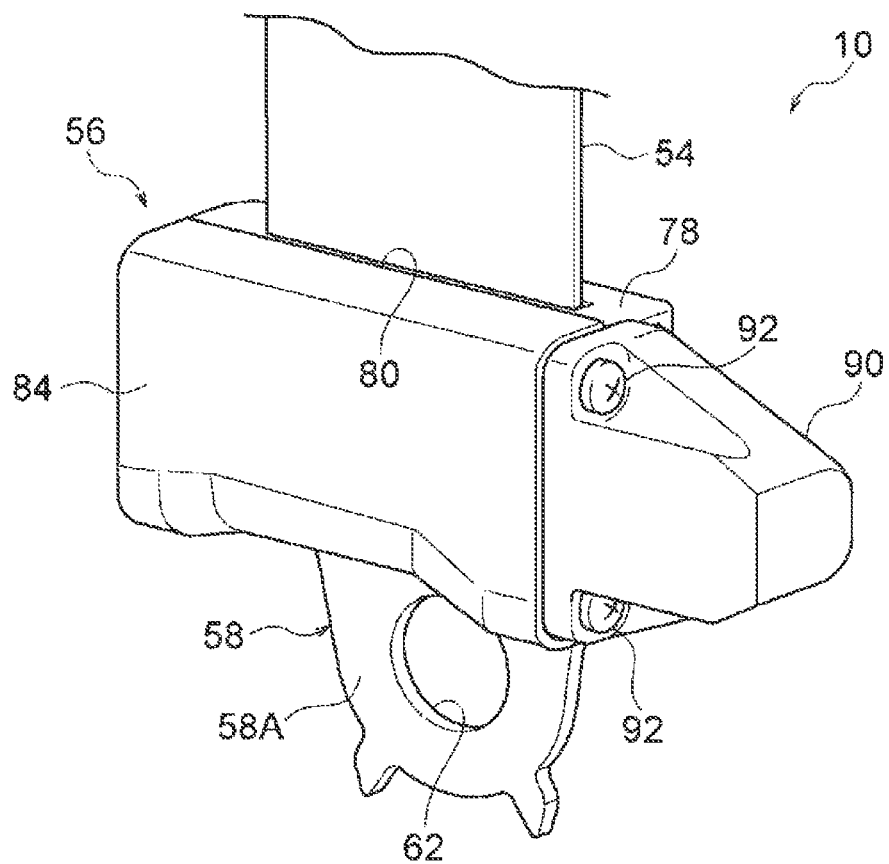
FIG. 4 is a perspective view of a force limiter mechanism included in the buckle device according to the first embodiment.
Figure 5:
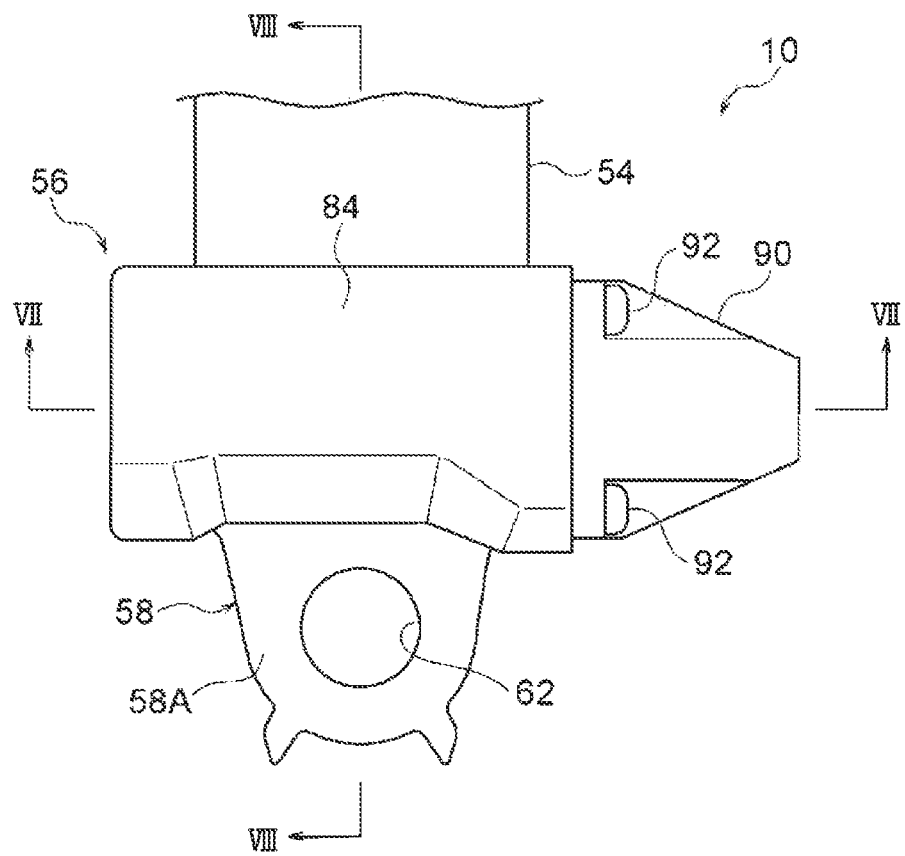
FIG. 5 is a side view of the force limiter mechanism according to the first embodiment.
Figure 6:
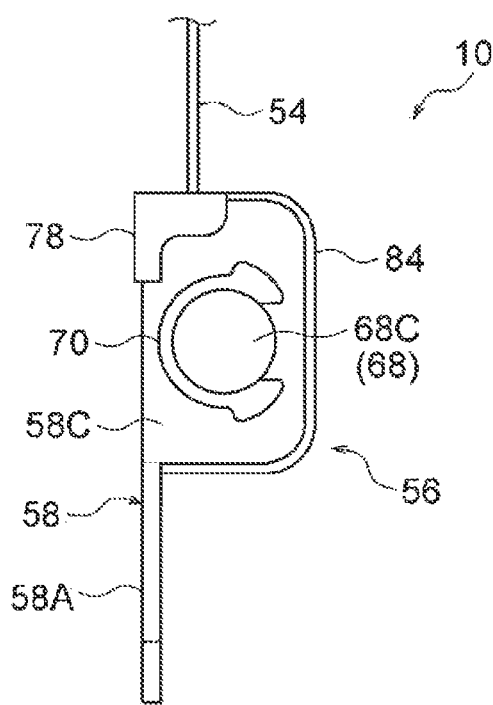
FIG. 6 is a rear view of the force limiter mechanism according to the first embodiment.

A lifter mechanism 30 for adjusting the vertical position of the seat cushion 18 is disposed between the seat cushion 18 and the right and left slide rails 24. The lifter mechanism 30 includes right and left risers 32 (the left riser 32 is not shown in the figure), a pair of front and rear link members 34, 36 (see FIG. 1, not shown in FIG. 3), and an electric actuator, not shown. The right and left risers 32 are fixed to the upper surfaces of the right and left upper rails 28. The pair of front and rear link members 34, 36 are rotatably connected to each riser 32 and a frame 19 (see FIG. 3) of the seat cushion 18. The lifter mechanism 30 is configured to rotate the link member 36 by the driving force of the electric actuator to vertically displace the seat cushion 18. In FIG. 3, reference character 38 represents a center console.

A reclining mechanism 40 for adjusting the reclining angle of the seatback 20 is disposed between the rear end of the seat cushion 18 and the lower end of the seatback 20. The reclining mechanism 40 is configured to tilt the seatback 20 forward and rearward about the lower end of the seatback 20 by, e.g., the driving force of an electric actuator, not shown. The reclining mechanism 40 is covered by a recliner cover 42 (see FIG. 1), which is the cover, from outside in the lateral direction of the vehicle seat 16. The slide mechanism 22, the lifter mechanism 30, and the reclining mechanism 40 may be of a manually operated type.

As shown in FIG. 1, the vehicle seat belt device 14 applied to the vehicle seat 16 includes a three-point seat belt (webbing) 46 for restraining an occupant, the buckle device 10, and an anchor bracket 94. The buckle device 10 is disposed on the middle side (in this example, the right side) of the vehicle seat 16 in the lateral direction of the vehicle. The anchor bracket 94 is disposed below the buckle device 10 in the vertical direction of the vehicle. The seat belt 46 is not shown in FIG. 3.

An anchor plate, not shown, is fixed to the vehicle body floor F at a position on the outer side (in this example, the left side) of the vehicle seat 16 in the lateral direction of the vehicle, and a retractor (webbing take-up device), not shown, is mounted on the lower part of a center pillar etc. One longitudinal end, not shown, of the seat belt 46 is retained by the anchor plate, and the other longitudinal end, not shown, of the seat belt 46 is retained by a take-up shaft of the retractor. A shoulder anchor, not shown, is mounted on the upper part of the center pillar etc. An intermediate portion of the seat belt 46 is inserted through the shoulder anchor and folded back. A tongue portion (tongue plate) 48 is slidably mounted on a portion of the seat belt 46 which is located between the shoulder anchor and the anchor plate. The tongue portion 48 is adapted to the buckle device 10.

Figure 2:
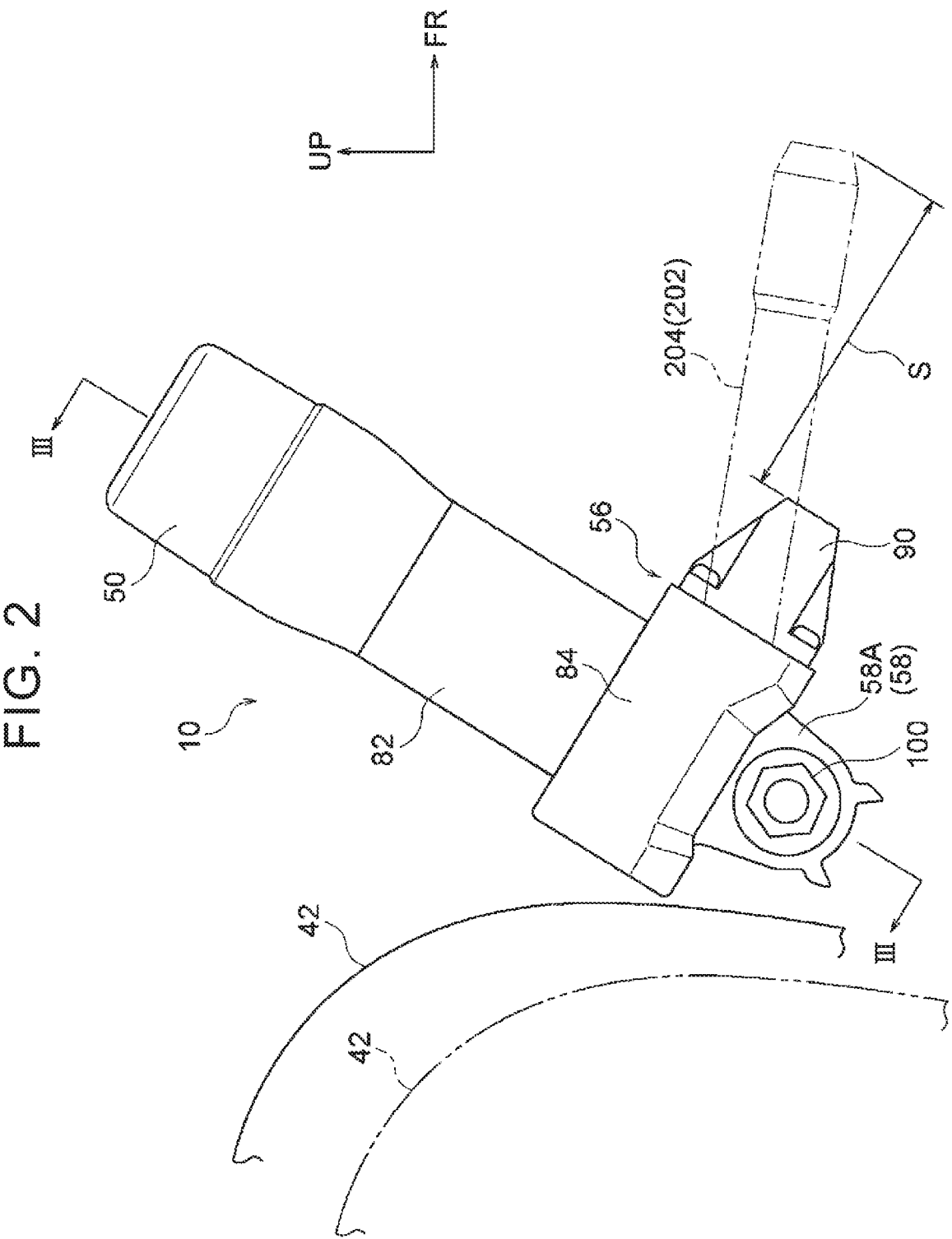
FIG. 2 is a partial enlarged side view of FIG. 1.

As shown in FIGS. 1 to 3, the buckle device 10 is disposed on the middle side of the vehicle seat 16 in the lateral direction of the vehicle at a position on the lateral side (in this example, the right side) of the rear part of the seat cushion 18. The buckle device 10 includes a buckle body 50 to which the tongue portion 48 is to be connected, a webbing 54 (see FIG. 3) that is a strip-shaped member (connecting member), a force limiter mechanism 56, and a boot 82.

The buckle body 50 is in the shape of a substantially rectangular block and is provided in the upper part of the buckle device 10. A retaining mechanism, not shown, that retains the tongue portion 48, a releasing mechanism, not shown, that releases the tongue portion 48 from the retaining mechanism, and a frame 52 (see FIG. 3) having the retaining mechanism and the releasing mechanism attached thereto are provided in the buckle body 50. The frame 52 has a connecting portion 52A at its base end (lower end). One longitudinal end of the webbing 54 is connected to (retained by) the connecting portion 52A.

The webbing 54 has a long strip shape, is made of a material similar to that of the seat belt 46, and is flexible. The one longitudinal end of the webbing 54 is wrapped around the connecting portion 52A, and both ends of the wrap around portion are sewn together. The other longitudinal end of the webbing 54 is retained by a spool 68 (see FIGS. 3 and 7 to 9) that is a take-up shaft of the force limiter mechanism 56.

Figure 9:
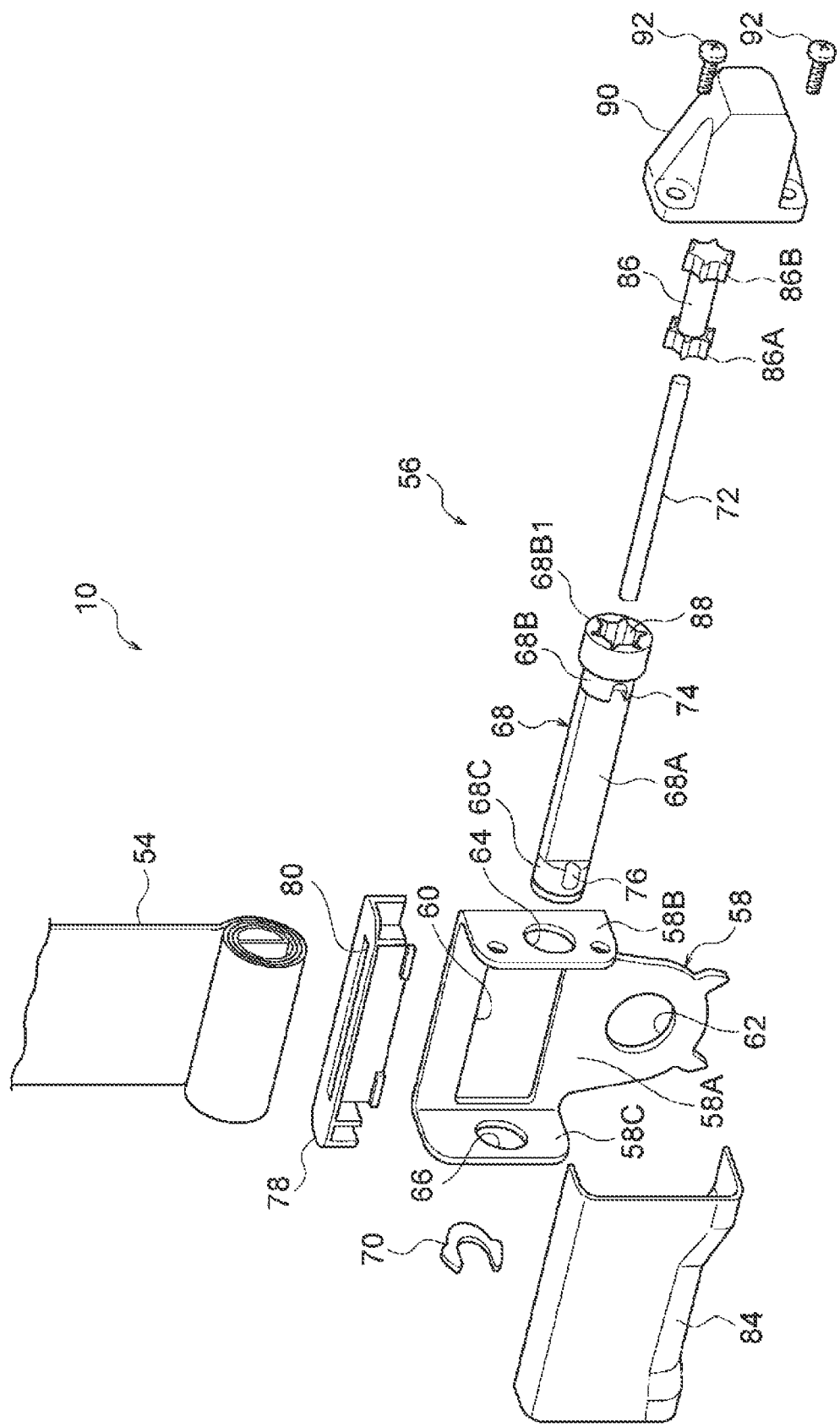
FIG. 9 is an exploded perspective view of the force limiter mechanism according to the first embodiment.

As shown in FIGS. 1 to 9, the force limiter mechanism 56 includes, in addition to the spool 68, a frame 58, a bar 72, a protector 78, a cover 84, a torsion shaft (torsion bar) 86, and a case 90. The frame 58 is produced by, e.g., press drawing of a steel sheet. As shown in FIG. 9, the frame 58 includes a back plate 58A. Leg portions 58B, 58C are extended approximately at right angles from both lateral ends of the upper part of the back plate 58A. The frame 58 thus has substantially a U-shape that is open on the outer side in the lateral direction of the vehicle seat 16 as viewed in plan. A long rectangular opening 60 is formed in an upper part of the back plate 58A and a circular attachment hole 62 is provided in a lower part of the back plate 58A. The leg portions 58B, 58C have circular bearing holes 64, 66, respectively. The bearing holes 64, 66 are formed coaxially and are adapted to the spool 68.

Figure 7:
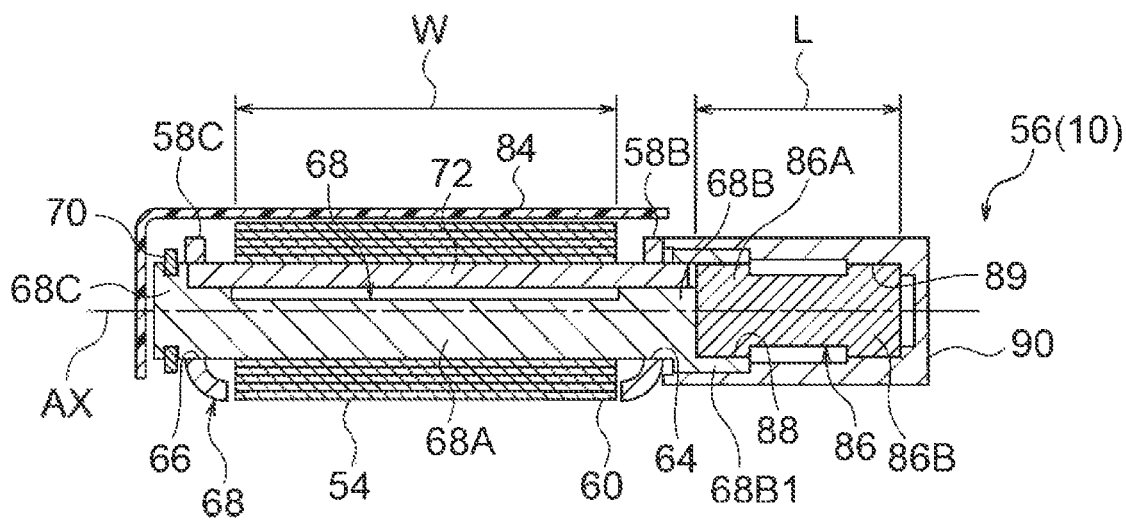
FIG. 7 is a sectional view taken along line VII-VII in FIG. 5.
Figure 8:
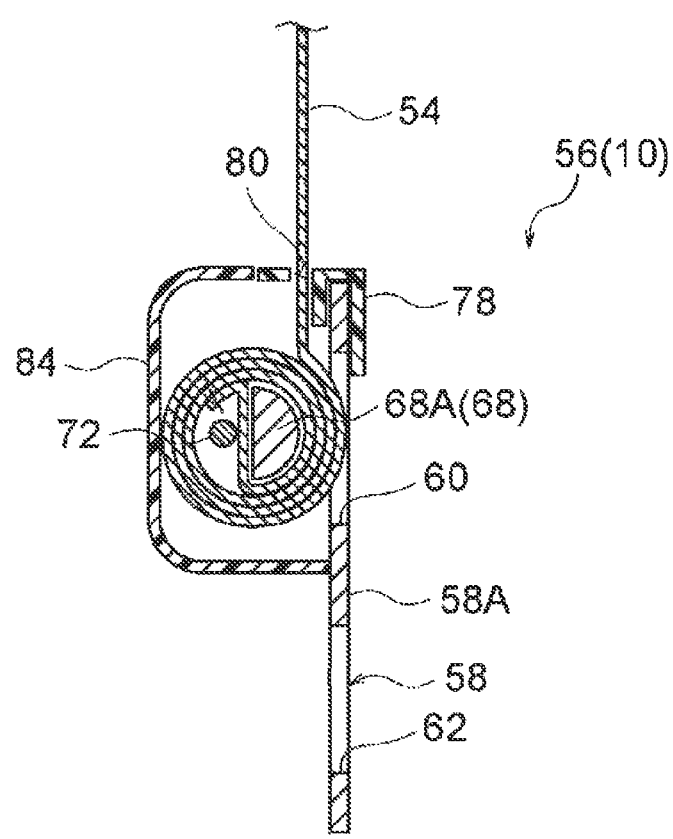
FIG. 8 is a sectional view taken along line VIII-VIII in FIG. 5.

The spool 68 is produced by, e.g., forging and has a substantially cylindrical shape. As shown in FIG. 9, an axial intermediate portion of the spool 68 is a webbing retaining portion 68A having a substantially D-shaped section, and both axial ends of the spool 68 are shaft portions 68B, 68C having a circular section. The shaft portions 68B, 68C of the spool 68 are rotatably fitted in the bearing holes 64, 66 of the leg portions 58B, 58C. The spool 68 is thus supported by the frame 58 so as to be rotatable relative to the frame 58. In FIG. 7, reference character AX represents the axis of the spool 68.

One shaft portion 68B of the spool 68 has a large diameter portion 68B1 having a larger diameter than the bearing hole 64. The large diameter portion 68B1 is engaged with the edge of the bearing hole 64 from the opposite side of the leg portion 58B from the leg portion 58C. The spool 68 has a substantially C-shaped ring 70 fitted on the other shaft portion 68C. The ring 70 is engaged with the edge of the bearing hole 66 from the opposite side of the leg portion 58C from the leg portion 58B. This configuration restricts axial displacement of the spool 68 with respect to the frame 58.

The other longitudinal end of the webbing 54 is wrapped around the webbing retaining portion 68A of the spool 68, and both ends of the wrap around portion of the webbing 54 are sewn together. The other longitudinal end of the webbing 54 is thus retained by the spool 68. The spool 68 has the cylindrical metal bar 72 attached thereto. The bar 72 restricts rotation of the webbing 54 relative to the spool 68. The bar 72 is attached parallel to the spool 68. Both axial ends of the bar 72 are fitted in grooves 74, 76 formed in the shaft portions 68B, 68C of the spool 68. Both axial ends of the bar 72 are located in the bearing holes 64, 66 of the frame 58 and are thus hindered from coming off from the grooves 74, 76.

The other longitudinal end of the webbing 54 is wound around the spool 68, and the one longitudinal end of the webbing 54 extends upward from the spool 68. A longitudinal intermediate portion of the webbing 54 is inserted through a webbing insertion hole 80 formed in the protector 78. The protector 78 is, e.g., a resin molded article and is attached to the upper end of the frame 58 by claw fitting etc. The protector 78 prevents contact between the webbing 54 and the frame 58.

The boot 82 is provided between the protector 78 and the buckle body 50. The boot 82 is made of, e.g., a soft resin or rubber and is in the shape of a long, substantially rectangular tube. The lower part of the buckle body 50 is fitted in one longitudinal end (upper end) of the boot 82, and the one longitudinal end portion of the webbing 54 is accommodated in the boot 82. The buckle body 50 is held standing by the boot 82. A part of the other longitudinal end of the webbing 54 wound around the spool 68 is placed in the opening 60 in the back plate 58A of the frame 58. This configuration reduces the thickness dimension of the force limiter mechanism 56 in the thickness direction of the back plate 58A.

The cover 84 is attached to the upper part of the frame 58 from the opposite side of the frame 58 from the back plate 58A. The cover 84 is, e.g., a resin molded article and has a substantially U-shaped section that is open on the inner side in the lateral direction of the vehicle seat 16 as viewed in the axial direction of the spool 68. The cover 84 is attached to the frame 58 by claw fitting etc. and covers the spool 68 and the other longitudinal end of the webbing 54.

As shown in FIG. 9, the torsion shaft 86, which is the energy absorbing member, is placed on the opposite side of the one shaft portion 68B of the spool 68 from the webbing retaining portion 68A. The torsion shaft 86 is deformed by rotation of the spool 68. The torsion shaft 86 is formed in a substantially cylindrical shape by, e.g., forging and is coaxially disposed next to the spool 68 in the axial direction (the direction of the axis AX in FIG. 7). A length L (see FIG. 7) of the torsion shaft 86 is smaller than a lateral dimension W (see FIG. 7) of the webbing 54.

Splines 86A, 86B are formed on both axial ends of the torsion shaft 86. The splines 86A on one axial end of the torsion shaft 86 are fitted in a spline hole 88 formed in the large diameter portion 68B1 of the shaft portion 68B of the spool 68. The one axial end of the torsion shaft 86 is thus connected to the spool 68 so as not to be rotatable relative to the spool 68. The splines 86B on the other axial end of the torsion shaft 86 are adapted to the case (force limiter case) 90.

The case 90 is produced by die casing of, e.g., an aluminum alloy and is in the shape of a bottomed, substantially rectangular tube. The case 90 accommodates the torsion shaft 86 and is fixed to the leg portion 58B with a pair of screws 92. The case 90 has spline hole 89 (see FIG. 7) in its bottom wall, and the splines 86B on the other axial end of the torsion shaft 86 are fitted in the spline hole 89. The other axial end of the torsion shaft 86 is thus connected to the case 90 so as not to be rotatable relative to the case 90.

In the force limiter mechanism 56 having the above configuration, when a rotational force acting on the spool 68 becomes larger than the endurable torsional load (endurable deformation load) of the torsion shaft 86, the torsion shaft 86 is torsionally deformed and the spool 68 is allowed to rotate.

The buckle device 10 including the force limiter mechanism 56 having the above configuration is mounted on the vehicle seat 16 via the anchor bracket 94. The anchor bracket 94 (not shown except FIGS. 1 and 3) is formed by, e.g., press forming a steel sheet and has an L-shaped section as viewed in the longitudinal direction of the vehicle. The anchor bracket 94 has a fixed wall, not shown, fixed to the upper surface of the rear part of the upper rail 28 and a vertical wall 94A extending upward from the outer end of the fixed wall in the lateral direction (the end on the middle side in the lateral direction of the vehicle) of the vehicle seat 16.

The lower part of the frame 58 of the force limiter mechanism 56 is placed on the upper part of the vertical wall 94A from the outer side in the lateral direction of the vehicle seat 16. The vertical wall 94A has a through hole 96 in its upper part. The through hole 96 is concentric with the attachment hole 62 of the frame 58. A nut 100 is screwed on a stepped bolt 98 extending through the through hole 96 and the attachment hole 62. The axial direction of the stepped bolt 98 extends in the lateral direction of the vehicle, and the frame 58, namely the force limiter mechanism 56, is connected to the anchor bracket 94 so as to be rotatable relative to the anchor bracket 94 about the axis extending in the lateral direction of the vehicle. The spool 68 of the force limiter mechanism 56 is supported via the frame 58 so as to be rotatable relative to the vehicle seat 16.

As shown in FIG. 1, with the buckle device 10 being mounted on the vehicle seat 16, the force limiter mechanism 56 is located in front of the recliner cover 42 in the longitudinal direction of the vehicle. In this mounted state, the spool 68 of the force limiter mechanism 56 is disposed in such an attitude that the axis of the spool 68 is perpendicular to the lateral direction of the vehicle (specifically, in an attitude tilted such that the front end of the spool 68 in the longitudinal direction of the vehicle is located lower than the rear end of the spool 68 in the longitudinal direction of the vehicle). In this mounted state, the torsion shaft 86 covered by the case 90 is located in front of the spool 68 covered by the cover 84 in the longitudinal direction of the vehicle, namely is located on the opposite side of the spool 68 from the recliner cover 42. The recliner cover 42 is configured to be displaced between a lower position shown by a long dashed double-short dashed line in FIG. 2 and an upper position shown by a solid line in FIG. 2 by operation of the lifter mechanism 30.

Functions and Effects

Functions and effects of the first embodiment will be described.

According to the present embodiment, in case of a collision of the vehicle, the load from the occupant P trying to move inertially toward the front side of the vehicle is applied to the buckle body 50 via the three-point seat belt 46 and the tongue portion 48. The one longitudinal end of the webbing 54 is connected to the buckle body 50. The other longitudinal end of the webbing 54 is wound around the spool 68 of the force limiter mechanism 56. The spool 68 is supported below the buckle body 50 in the vertical direction of the vehicle so as to be rotatable relative to the vehicle seat 16.

When the buckle body 50 and the webbing 54 are pulled by the above load, a rotational force acts on the spool 68. When this rotational force becomes larger than the endurable torsional load of the torsion shaft 86, the torsion shaft 86 is torsionally deformed and the spool 68 is allowed to rotate. The other longitudinal end of the webbing 54 is thus pulled out from the spool 68, and the buckle body 50 is displaced in the direction in which the above load is applied. At this time, the load provided for the torsional deformation of the torsion shaft 86 is applied to the seat belt 46 as a force limiter load. Shock applied from the seat belt 46 to the occupant P is thus absorbed. The rotation of the spool 68 and the torsional deformation of the torsion shaft 86 stop when the portion of the webbing 54 wound around the spool 68 is completely pulled out. The load applied to the seat belt 46 is thereafter received by the vehicle body floor F via the spool 68, the frame 58, the anchor bracket 94, and the slide rails 24 until restraint of the occupant is finished.

In the force limiter mechanism 56, the amount by which the webbing 54 is pulled out from the spool 68 during shock absorption is equal to the displacement (shock absorption stroke) of the buckle body 50. That is, the amount by which the webbing 54 is wound around the spool 68 in a normal state is equal to the shock absorption stroke. Accordingly, an increase in size of the force limiter mechanism 56 which is associated with ensuring a sufficient shock absorption stroke is restrained as compared to a pipe type force limiter mechanism in which a cylindrical member becomes longer in proportion to the shock absorption stroke.

In FIG. 2, reference character 204 indicates an example of the cylindrical member included in a conventional pipe type force limiter mechanism 202, and reference character S indicates reduction in size that can be achieved by the present embodiment as compared to the configuration having the a cylindrical member 204. As described above, in the present embodiment, the overall configuration of the buckle device 10 having the force limiter mechanism 56 is thus reduced in size as compared to conventional examples. The buckle device 10 thus has improved mountability on vehicles. Especially, pipe type force limiter mechanisms tend to be long in the longitudinal dimension of the vehicle. However, the present embodiment achieves significant reduction in dimension in the longitudinal direction of the vehicle.

Figure 10:
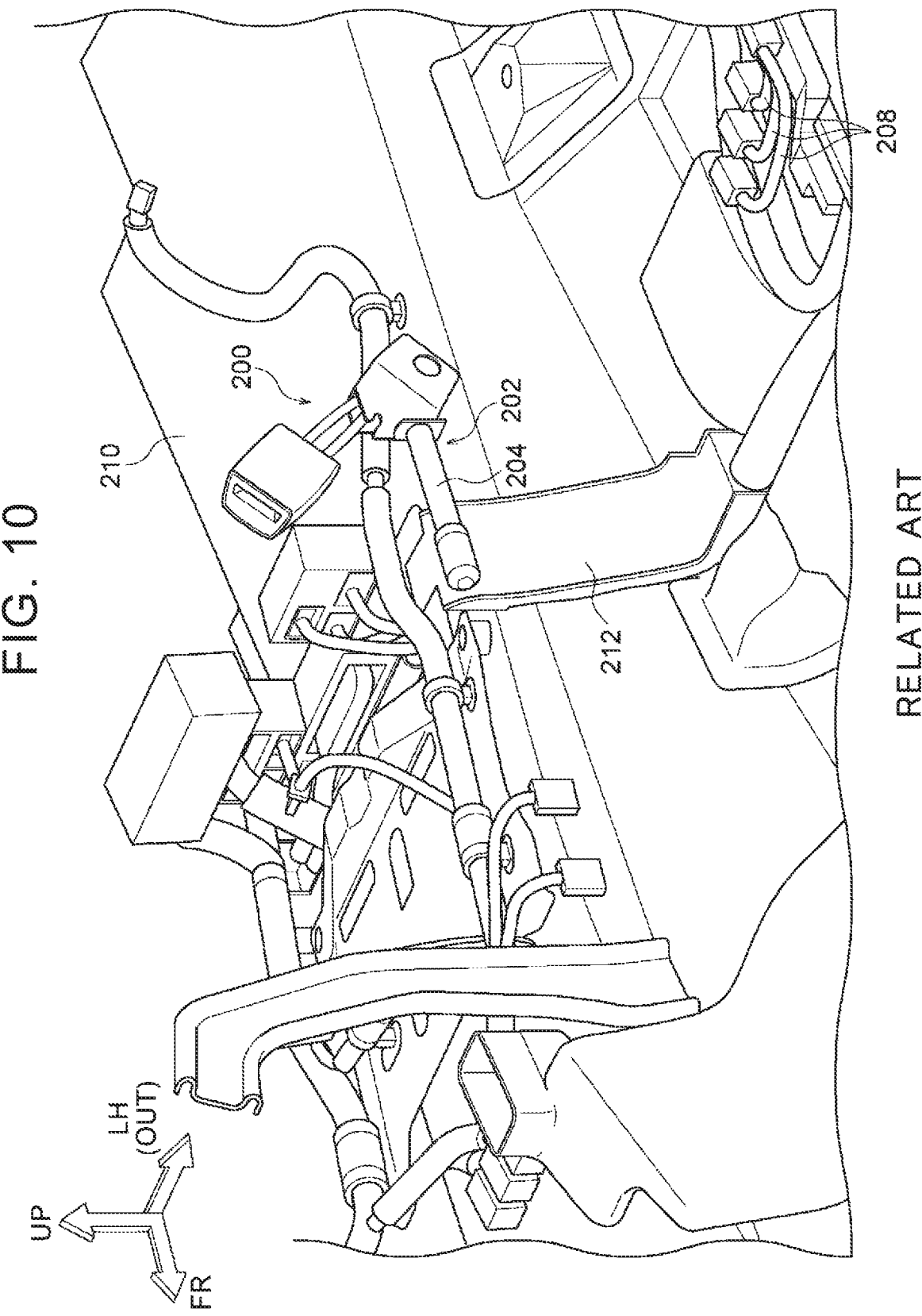
FIG. 10 is a perspective view illustrating a space for mounting a buckle device according to a comparative example.

The above effects will be supplementarily described using a comparative example shown in FIG. 10. In a vehicle according to the comparative example, a plurality of electrical wires 208 for supplying electric power to a vehicle seat (not shown in FIG. 10) are routed from a floor tunnel 210 side toward the vehicle seat side (toward the side shown by arrow LH in FIG. 10). The electrical wires 208 and a cover 212 that covers the electrical wires 208 are disposed between the floor tunnel 210 and the vehicle seat. As shown in FIG. 10, interference between the cover 212 and the cylindrical member 204 is a problem when a buckle device 200 including the pipe type force limiter mechanism 202 is applied to such a vehicle. However, the present embodiment solves such a problem.

Since the present embodiment is configured so that the torsion shaft 86 is torsionally deformed by the rotational force that acts on the spool 68, energy is efficiently absorbed by the small torsion shaft 86. That is, a required shock absorption stroke is obtained by the torsion shaft 86 even though the axial length of the torsion shaft 86 is smaller than that of the cylindrical member 204 shown in FIGS. 2 and 10. The buckle device 10 is thus easily reduced in size.

In the present embodiment, the torsion shaft 86 is coaxially disposed next to the spool 68 in the axial direction. The diameter of the spool 68 is therefore reduced as compared to the case where, e.g., the torsion shaft 86 is coaxially disposed in the spool 68. As a result, the thickness of the force limiter mechanism 56 in the radial direction of the spool 68 (in the present embodiment, the lateral direction of the vehicle) is reduced, which improves mountability of the buckle device 10 in narrow clearance on the lateral side of the vehicle seat 16.

In the present embodiment, the spool 68 is supported below the buckle body 50 in the vertical direction of the vehicle so as to be rotatable relative to the vehicle seat 16, and the torsion shaft 86 is disposed in front of the spool 68 in the longitudinal direction of the vehicle. This configuration restrains degradation in mountability of the buckle device 10 on vehicles due to, e.g., interference between the torsion shaft 86 and the recliner cover 42 disposed behind the spool 68 in the longitudinal direction of the vehicle. Specifically, in the present embodiment, the recliner cover 42 is displaced between the lower position shown by the long dashed double-short dashed line in FIG. 2 and the upper position shown by the solid line in FIG. 2 during operation of the lifter mechanism 30. The torsion shaft 86 and the case 90 are disposed on the opposite side of the force limiter mechanism 56 from the region in which the recliner cover 42 is displaced. This configuration eliminates the need to consider the interference between the recliner cover 42 and the torsion shaft 86 when mounting the buckle device 10 on the vehicle seat 16.

In the present embodiment, the one longitudinal end of the webbing 54 that is the connecting member is connected to the buckle body 50, and the other longitudinal end of the webbing 54 is wound around the spool 68 of the force limiter mechanism 56. Since the webbing 54 is flexible and has a long strip shape, it is more easily ensured that the webbing 54 has sufficient resistance to bending as compared to the case where the connecting member is a wire (wire rope). For example, in the structure in which a wire is connected to a buckle body as in the buckle device disclosed in Japanese Patent Application Publication No. 2001-322531 (JP 2001-322531 A) described in the section "Description of Related Art," a part of the wire may be bent and stress may be applied to strands of the wire when an occupant P accidentally sits on the buckle body 50 when getting into the vehicle etc. In this regard, since the present embodiment is configured so that the webbing 54 made of a material similar to that of the seat belt 46 is connected to the buckle body 50, it is easily ensured that the webbing 54 has resistance to bending, and the webbing 54 is therefore easy to handle. Moreover, the webbing 54 can be wound around the spool 68 with a smaller winding diameter as compared to such a wire as described above. This also contributes to the reduction in thickness described above.

In the present embodiment, as shown in FIG. 7, the length L of the torsion shaft 86 is smaller than the lateral dimension W of the webbing 54. This configuration achieves further reduction in size of the buckle device 10 and thus further improves the mountability of the buckle device 10 in the narrow clearance on the lateral side of the vehicle seat 16.

Supplementary Description of First Embodiment

In the first embodiment, the webbing 54 that is the strip-shaped member is produced using a material similar to that of the seat belt 46. However, the disclosure is not limited to this. For example, a film-like strip-shaped member that is thinner than the seat belt 46 may be produced using a material having sufficient strength such as "Kevlar (registered trademark)." In this case, the strip-shaped member can be wound around the spool 68 (take-up shaft) with a smaller winding diameter, and further reduction in size of the buckle device 10 is achieved. The connecting member is not limited to the webbing 54 (strip-shaped member) but may be a wire (wire rope) etc.

In the first embodiment, the spool 68 and the bar 72 are produced as separate parts, and the spool 68 and the torsion shaft 86 are produced as separate parts. However, the disclosure is not limited to this. The spool 68 and the bar 72 may be produced as a single-piece part, and the spool 68 and the torsion shaft 86 may be produced as a single-piece part. In the first embodiment, the torsion shaft 86 is coaxially displaced next to the spool 68 in the axial direction. However, the disclosure is not limited to this, and the torsion shaft 86 may be coaxially displaced in the spool 68.

Similarly, in the first embodiment, the frame 58 and the case 90 are produced as separate parts. However, the disclosure is not limited to this. The frame 58 and the case 90 may be produced as a single-piece part. Alternatively, each of the frame 58 and the case 90 may be comprised of a plurality of parts. The frame 58 is not limited to the one produced by press drawing etc. The frame 58 may be comprised of a plurality of parts or may be an extended portion of a frame of the vehicle seat 16.

In the force limiter mechanism 56 according to the first embodiment, the spool 68 and the other longitudinal end portion of the webbing 54 wound around the spool 68 are covered by the cover 84. However, the disclosure is not limited to this. The cover 84 may be omitted. Alternatively, a cover that covers either the entire force limiter mechanism 56 including the frame 58 and the case 90 or most of the force limiter mechanism 56 or a cover that continuously covers from the buckle body 50 to the force limiter mechanism 56 may be provided to enhance appearance.

In the first embodiment, the frame 58, the spool 68, the bar 72, and the case 90 are made of a metal. However, the disclosure is not limited to this, and these members may be made of a resin (e.g., fiber-reinforced resin) that is lighter than metals.

Next, other embodiments will be described. The configurations and functions which are basically similar to those in the embodiment(s) that has been described are denoted with the same reference characters as those of the embodiment(s) that has been described, and description thereof will be omitted.

Second Embodiment

Figure 11:
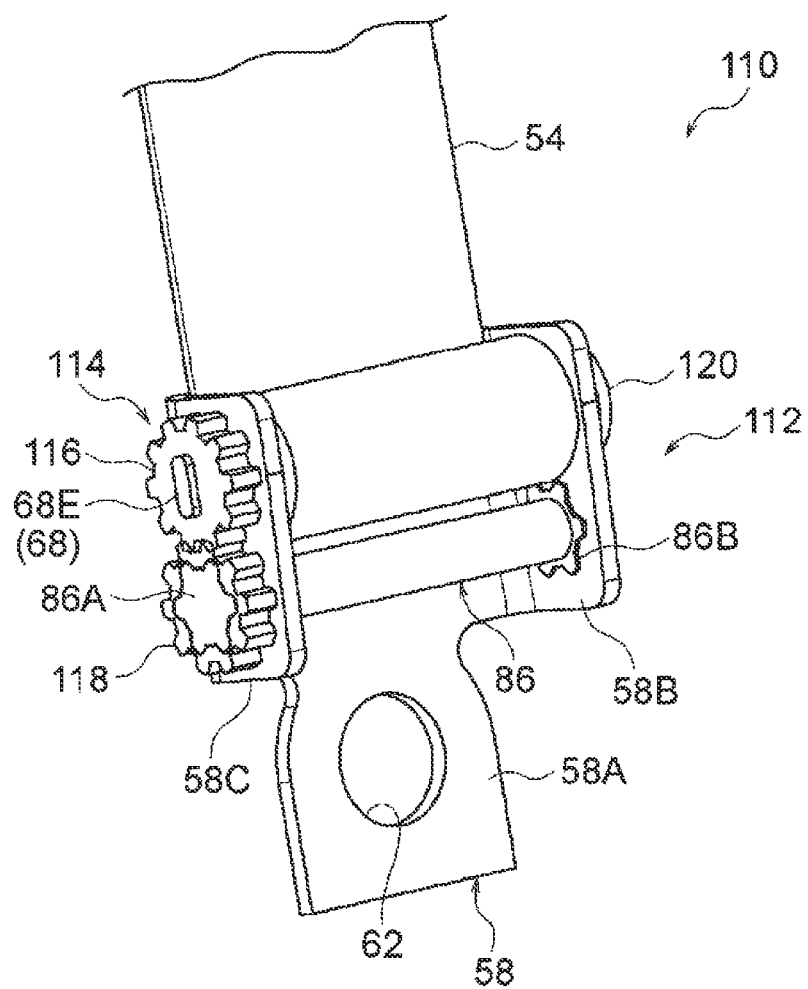
FIG. 11 is a perspective view of a force limiter mechanism of a buckle device according to a second embodiment.
Figure 12:
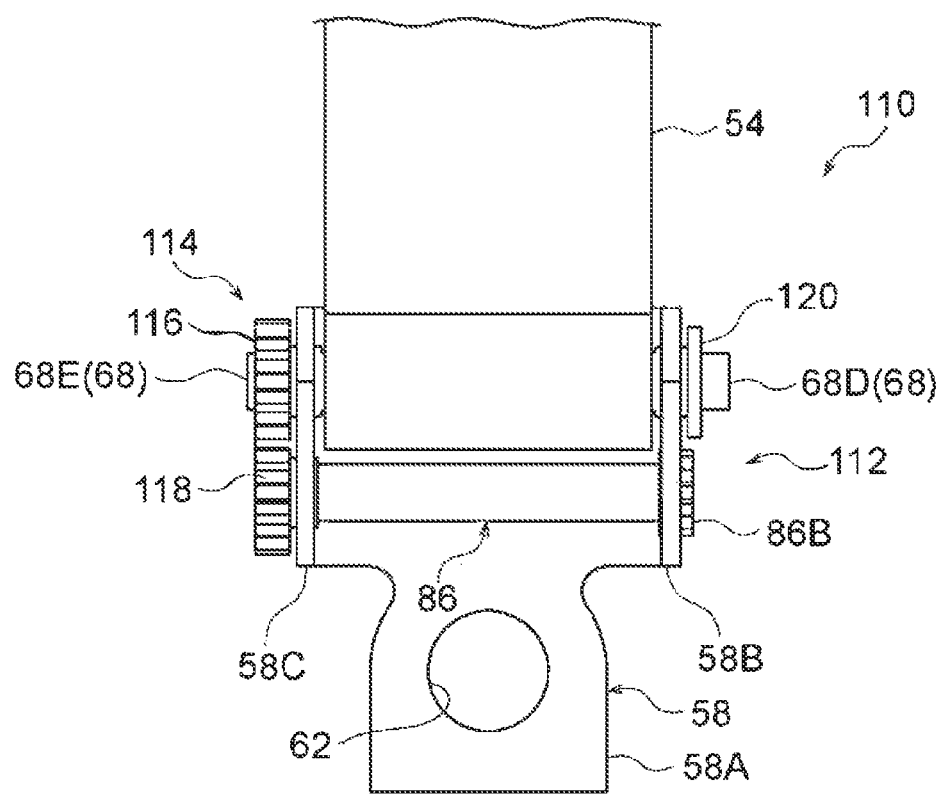
FIG. 12 is a side view of the force limiter mechanism according to the second embodiment.
Figure 13:
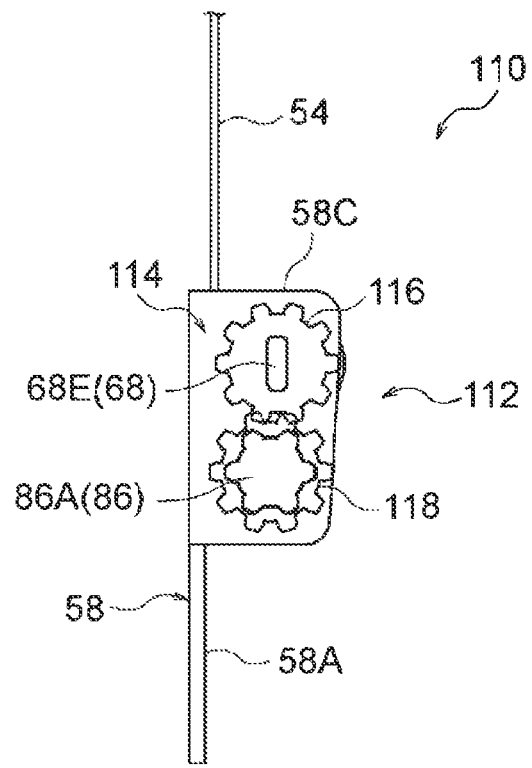
FIG. 13 is a rear view of the force limiter mechanism according to the second embodiment.
Figure 14:
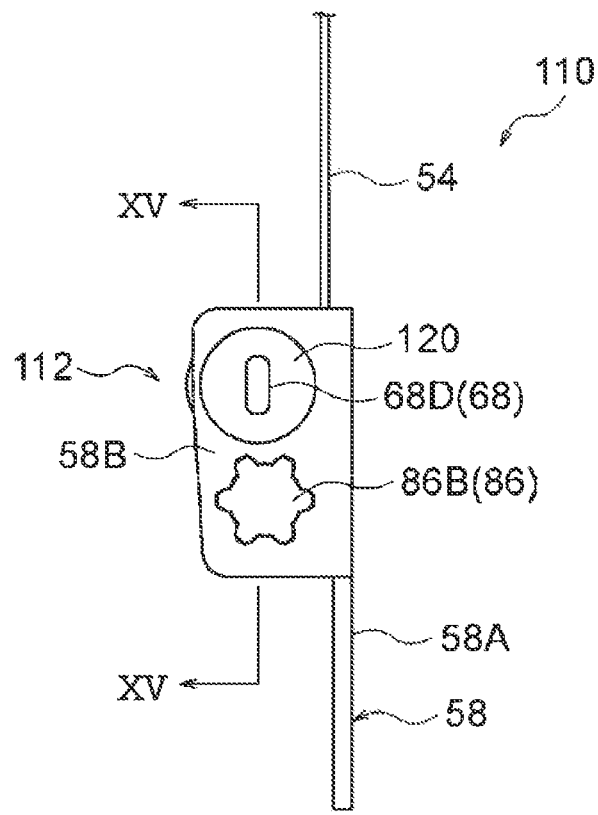
FIG. 14 is a front view of the force limiter mechanism according to the second embodiment.
Figure 15:
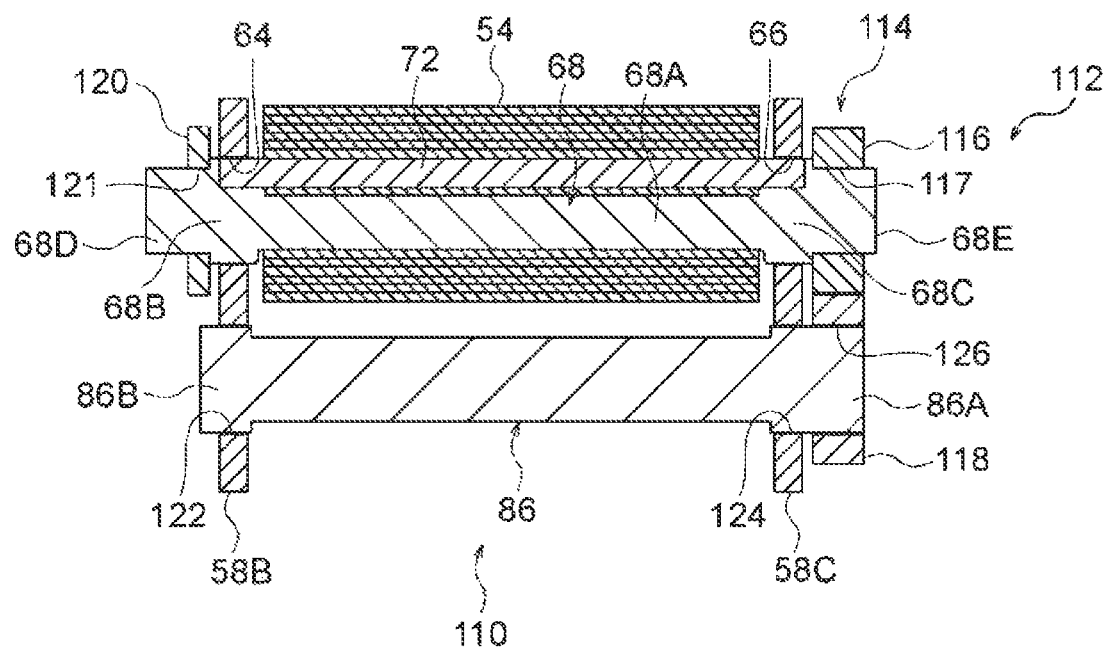
FIG. 15 is an enlarged sectional view taken along line XV-XV in FIG. 14.
Figure 16:
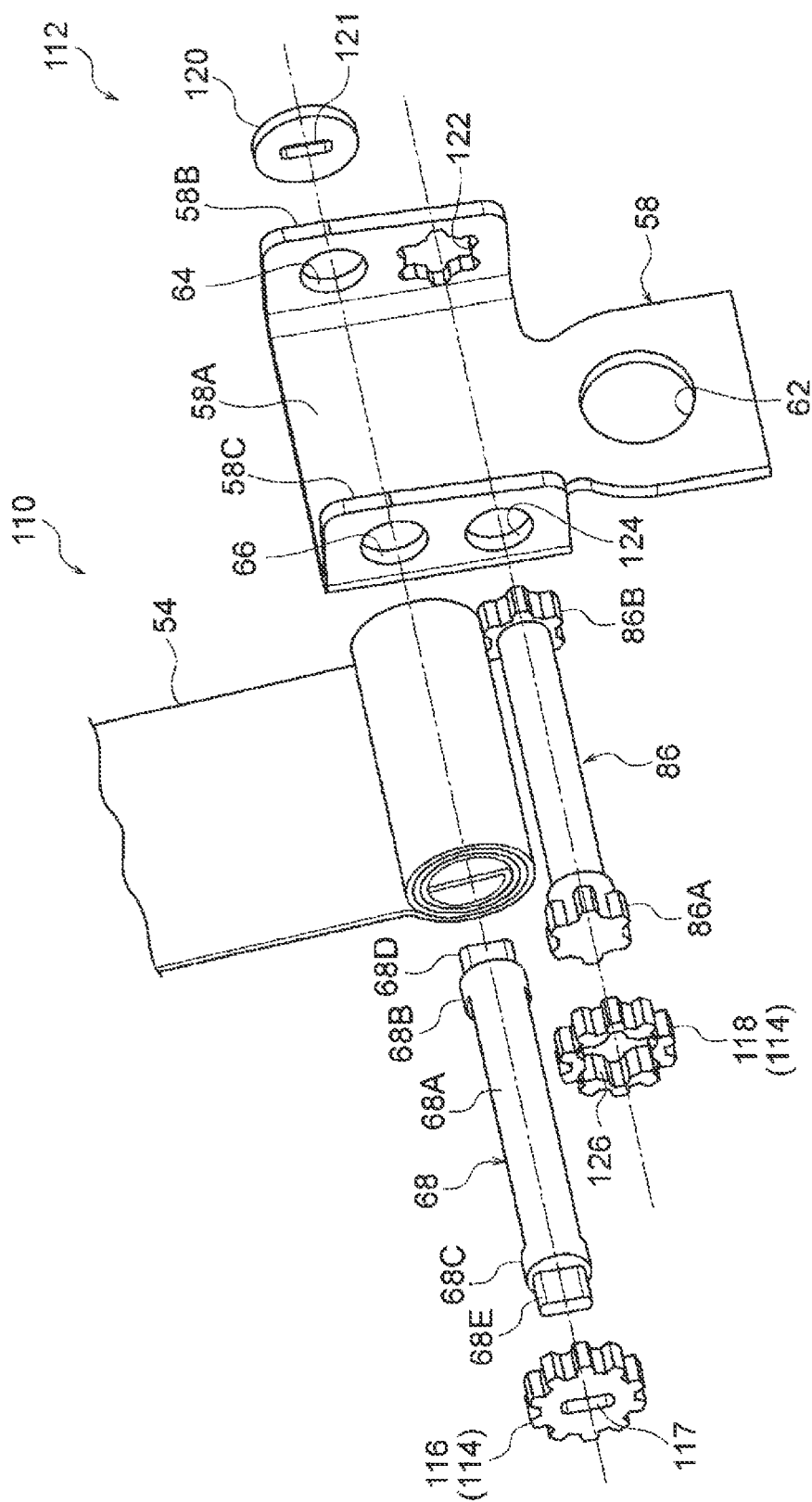
FIG. 16 is an exploded perspective view of the force limiter mechanism according to the second embodiment.

FIG. 11 is a perspective view of a force limiter mechanism 112 included in a buckle device 110 according to a second embodiment. FIG. 12 is a side view of the force limiter mechanism 112, FIG. 13 is a rear view of the force limiter mechanism 112, and FIG. 14 is a front view of the force limiter mechanism 112. FIG. 15 is an enlarged sectional view taken along line XV-XV in FIG. 14, and FIG. 16 is an exploded perspective view of the force limiter mechanism 112.

As shown in FIGS. 11 to 16, the force limiter mechanism 112 of the buckle device 110 according to the second embodiment includes a spur gear train 114 that transmits rotation of the spool 68 to the torsion shaft 86. The torsion shaft 86 is disposed parallel to the spool 68.

As in the first embodiment, the shaft portions 68B, 68C are formed at both axial ends of the spool 68, and the shaft portions 68B, 68C are rotatably fitted in the bearing holes 64, 66 of the frame 58. The spool 68 is supported by the frame 58 so as to be rotatable relative to the frame 58. Plate-like fixing portions 68D, 68E are formed at both axial ends of the spool 68 in order to fix a spur gear 116 and a retaining member 120 thereto. The spur gear 116 and the retaining member 120 are disposed coaxially with the spool 68, and the fixing portions 68D, 68E are press-fitted in fixing holes 117, 121 (see FIG. 16) formed in the centers of the spur gear 116 and the retaining member 120. The spur gear 116 and the retaining member 120 are thus fixed to both axial ends of the spool 68, so that axial movement of the spool 68 with respect to the frame 58 is restricted.

The torsion shaft 86 is longer than the torsion shaft 86 according to the first embodiment and is disposed below the spool 68 in an attitude parallel to the spool 68. The splines 86B on the other axial end of the torsion shaft 86 are fitted in a spline hole 122 formed in the leg portion 58B of the frame 58. The one axial end portion of the torsion shaft 86 is rotatably fitted in a circular bearing hole 124 formed in the leg portion 58C of the frame 58. The splines 86A on the one axial end of the torsion shaft 86 are disposed on the opposite side of the leg portion 58C from the leg portion 58B and are adapted to a spur gear 118. The spur gear 118 is disposed coaxially with the torsion shaft 86, and the splines 86A are press-fitted in a spline hole 126 formed in the center of the spur gear 118. The spur gear 118 is thus fixed to the one axial end of the torsion shaft 86. The spur gear 118 meshes with the spur gear 116. Rotation of the spool 68 is thus transmitted to the torsion shaft 86 via the spur gears 116, 118, that is, via the spur gear train 114.

The configuration of the present embodiment is otherwise similar to that of the first embodiment. Accordingly, the present embodiment also improves mountability of the buckle device 110 on vehicles like the first embodiment. Since the force limiter mechanism 112 has the spur gear train 114, the torsion shaft 86 can be disposed on an axis other than the axis of the spool 68. Flexibility in positioning of the torsion shaft 86 is thus improved. Moreover, the torsion shaft 86 is disposed below and parallel to the spool 68. Accordingly, even though the torsion shaft 86 is longer than in the first embodiment, the force limiter mechanism 112 is reduced in thickness in the lateral direction of the vehicle (the thickness direction of the back plate 58A), and is also reduced in size in the longitudinal direction of the vehicle as compared to the force limiter mechanism 56 according to the first embodiment.

In the second embodiment, the spool 68 and the torsion shaft 86 may be switched in position in the vertical direction. The spool 68 and the torsion shaft 86 may be disposed so as to sandwich the attachment hole 62 of the frame 58 in the vertical direction as viewed in the lateral direction of the vehicle seat 16 (the attachment hole 62 may be located between the spool 68 and the torsion shaft 86 as viewed in the lateral direction of the vehicle seat 16).

Third Embodiment

Figure 17:
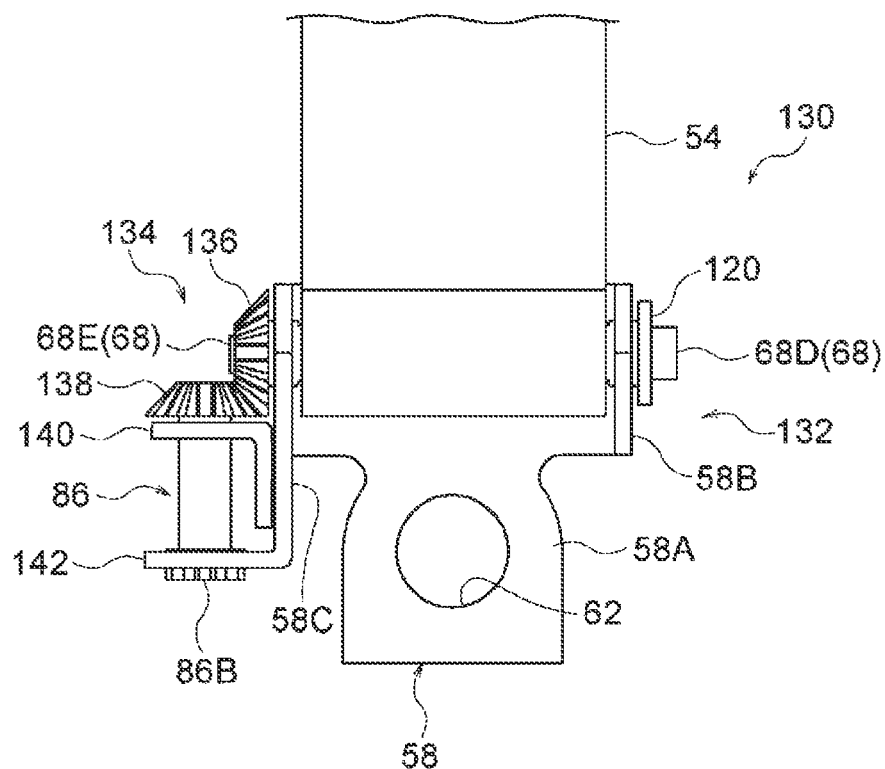
FIG. 17 is a side view of a force limiter mechanism of a buckle device according to a third embodiment.

FIG. 17 is a side view of a force limiter mechanism 132 included in a buckle device 130 according to a third embodiment. The force limiter mechanism 132 has a bevel gear train 134 that transmits rotation of the spool 68 to the torsion shaft 86, and the torsion shaft 86 is disposed perpendicularly to the spool 68. The torsion shaft 86 is supported by a pair of upper and lower support portions 140, 142 extended from the leg portion 58C of the frame 58. The upper support portion 140 has a circular through hole (not shown) in which one axial end portion of the torsion shaft 86 is rotatably fitted. The lower support portion 142 has a spline hole, not shown, in which the splines 86B on the other axial end of the torsion shaft 86 are fitted.

The splines 86A (not shown in FIG. 17) on the one axial end of the torsion shaft 86 are press-fitted in a spline hole, not shown, formed in the center of a bevel gear 138. The bevel gear 138 is disposed coaxially with the torsion shaft 86 and meshes with another bevel gear 136 disposed coaxially with the spool 68. The fixing portion 68E of the spool 68 is press-fitted in a fixing hole, not shown, formed in the center of the bevel gear 136, so that the bevel gear 136 is fixed to the spool 68. Rotation of the spool 68 is thus transmitted to the torsion shaft 86 via the bevel gears 136, 138, that is, via the bevel gear train 134.

The configuration of the present embodiment is otherwise similar to that of the first embodiment. Accordingly, the present embodiment also improves mountability of the buckle device 130 on vehicles like the first embodiment. Since the force limiter mechanism 132 has the bevel gear train 134, flexibility in positioning of the torsion shaft 86 with respect to the spool 68 is improved and mountability of the buckle device 130 on various vehicles is improved. Since the torsion shaft 86 is disposed perpendicularly to the spool 68, the dimension of the force limiter mechanism 132 in the axial direction of the spool 68 is reduced.

Fourth Embodiment

Figure 18:
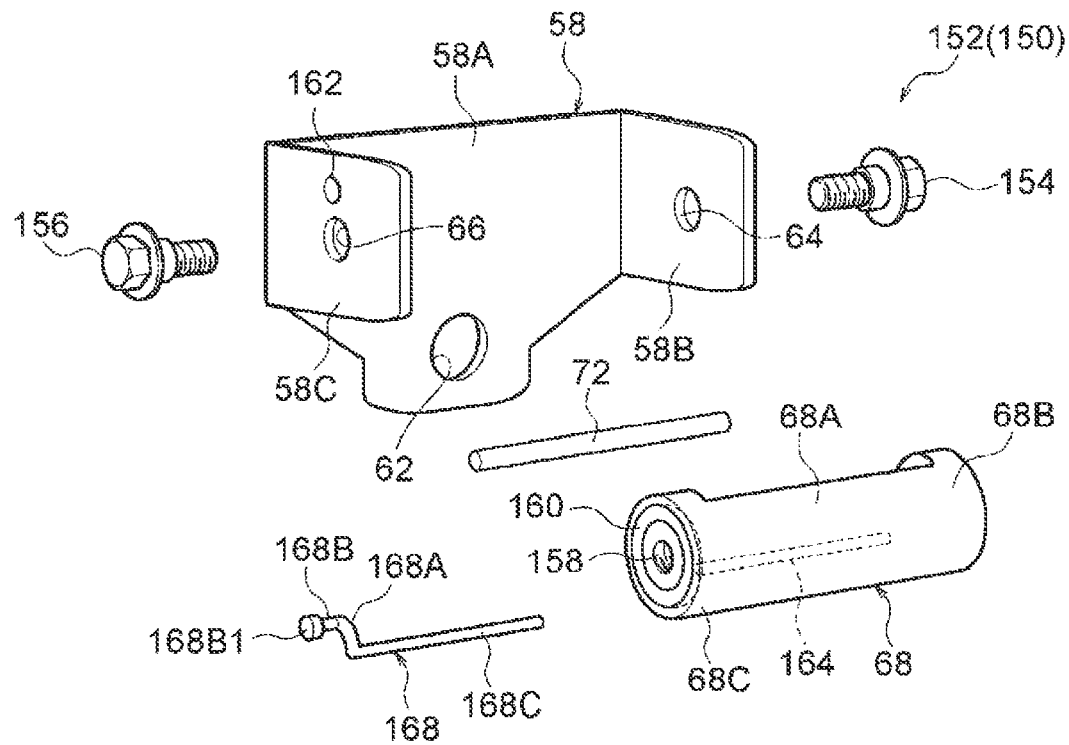
FIG. 18 is an exploded perspective view of a force limiter mechanism of a buckle device according to a fourth embodiment.

FIG. 18 is an exploded perspective view of a force limiter mechanism 152 of a buckle device 150 according to a fourth embodiment. The force limiter mechanism 152 is a wire type force limiter mechanism. In the force limiter mechanism 152, stepped bolts 154, 156 are rotatably inserted through the bearing holes 64, 66 of the leg portions 58B, 58C of the frame 58. The stepped bolts 154, 156 are screwed into threaded holes 158 formed in both axial ends of the spool 68. The spool 68 is thus supported by the frame 58 so as to be rotatable relative to the frame 58.

A guide groove 160 is formed on one axial end face of the spool 68. The guide groove 160 has a ring shape concentric with the spool 68. The leg portion 58C of the frame 58 has a fixing hole 162 formed at a position facing the guide groove 160 and extending through the leg portion 58C. The spool 68 further has a fitting insertion hole 164. The fitting insertion hole 164 is a bottomed hole that is open to the bottom surface of the guide groove 160. The fitting insertion hole 164 extends in the axial direction of the spool 68.

The fixing hole 162, the guide groove 160, and the fitting insertion hole 164 are adapted to a wire 168 that is the energy absorbing member. The wire 168 is made of, e.g., a linear steel material formed in the shape of a wire. The wire 168 includes a curved portion 168A disposed in the guide groove 160. The curved portion 168A is curved like a bow according to the curvature of the guide groove 160. A fixing portion 168B is extended from one end of the curved portion 168A toward the opposite side from the spool 68. The fixing portion 168B is inserted through the fixing hole 162, and a head portion 168B1 formed on the tip end portion of the fixing portion 168B is engaged with the edge of the fixing hole 162. The fixing portion 168B is thus fixed to the frame 58. A fitting insertion portion 168C is extended from the other end of the curved portion 168A toward the spool 68 side. The fitting insertion portion 168C is slidably inserted in the fitting insertion hole 164.

In the force limiter mechanism 152 having the above configuration, the webbing 54 (not shown in FIG. 18) wound around the spool 68 is pulled by the load applied from the occupant P in case of a collision of the vehicle. When the rotational force acting on the spool 68 becomes equal to or larger than a predetermined value, the fitting insertion portion 168C of the wire 168 fittingly inserted in the fitting insertion hole 164 of the spool 68 is pulled out of the fitting insertion hole 164 while being in frictional contact with (deformed by) the opening edge of the fitting insertion hole 164, the leg portion 58C of the frame 58, and the inner wall surface of the guide groove 160. The load provided for the frictional contact (deformation) of the fitting insertion portion 168C is applied to the seat belt 46 as a force limiter load. Shock applied from the seat belt 46 to the occupant P is thus absorbed.

The configuration of the present embodiment is otherwise similar to that of the first embodiment. Accordingly, the present embodiment also improves mountability of the buckle device 150 on vehicles like the first embodiment.

Although the disclosure is described with respect to some embodiments, the embodiments can be carried out in various modified forms without departing from the spirit and scope of the disclosure. It should be understood that the scope of rights of the disclosure is not limited to the above embodiments.

What is claimed is:

1. A buckle device comprising:
   a buckle body to which a tongue portion mounted on a three-point seat belt is to be connected;
   a connecting member that is flexible and that has a first longitudinal end portion connected to the buckle body; and
   a force limiter mechanism including a take-up shaft around which a second longitudinal end portion of the connecting member is wound, the take-up shaft being supported below the buckle body in a vertical direction of a vehicle so as to be rotatable relative to a vehicle seat or a vehicle body, and a torsion shaft that is torsionally deformed by rotation of the take-up shaft and, the torsion shaft is coaxially disposed next to the take-up shaft in an axial direction.

2. The buckle device according to claim 1, wherein the torsion shaft is disposed in front of the take-up shaft in a longitudinal direction of the vehicle.

3. The buckle device according to claim 1, wherein the connecting member is a strip-shaped member having a long strip shape.

4. The buckle device according to claim 3, wherein the strip-shaped member is made of a film material thinner than the three-point seat belt.

5. The buckle device according to claim 3, wherein a length of the torsion shaft is smaller than a lateral dimension of the strip-shaped member.

6. The buckle device according to claim 1, wherein the force limiter mechanism includes a gear train that transmits the rotation of the take-up shaft to the torsion shaft.

7. The buckle device according to claim 6, wherein the gear train is a spur gear train.

8. The buckle device according to claim 6, wherein the gear train is a bevel gear train.

9. A seat mounting structure, comprising:
   a vehicle seat including a seat cushion connected to a vehicle body floor via a lifter mechanism and a slide mechanism, and a seatback connected to the seat cushion via a reclining mechanism;
   an anchor bracket fixed to a rear part of an upper rail included in the slide mechanism; and
   a buckle device comprising:
      a buckle body to which a tongue portion mounted on a three-point seat belt is to be connected;
      a connecting member that is flexible and that has a first longitudinal end portion connected to the buckle body; and
      a force limiter mechanism including a take-up shaft around which a second longitudinal end portion of the connecting member is wound, the take-up shaft being supported below the buckle body in a vertical direction of a vehicle so as to be rotatable relative to the vehicle seat or a vehicle body, and a torsion shaft that is torsionally deformed by rotation of the take-up shaft, the torsion shaft is coaxially disposed next to the take-up shaft in an axial direction, the force limiter mechanism is disposed in front of a cover of the reclining mechanism in a longitudinal direction of the vehicle is supported by the anchor bracket.

10. The seat mounting structure according to claim 9, wherein the torsion shaft is disposed in front of the take-up shaft in the longitudinal direction of the vehicle.

11. A vehicle seat belt device, comprising:
   a three-point seat belt;
   a tongue portion mounted on the three-point seat belt; and
   the buckle device according to claim 1 including the buckle body to which the tongue portion is to be connected.

12. A buckle device comprising:
   a buckle body to which a tongue portion mounted on a three-point seat belt is to be connected;
   a connecting member that is flexible and that has a first longitudinal end portion connected to the buckle body; and
   a force limiter mechanism including a take-up shaft around which a second longitudinal end portion of the connecting member is wound, the take-up shaft being supported below the buckle body in a vertical direction of a vehicle so as to be rotatable relative to a vehicle seat or a vehicle body, a torsion shaft and a gear train, the torsion shaft is torsionally deformed by rotation of the take-up shaft, and the gear train transmits the rotation of the take-up shaft to the torsion shaft.

13. The buckle device of claim 12, wherein the torsion shaft is disposed in front of the take-up shaft in a longitudinal direction of the vehicle.

14. The buckle device of claim 12, wherein the connecting member is a strip-shaped member having a long strip shape.

15. The buckle device of claim 14, wherein the strip-shaped member is made of a film material thinner than the three-point seat belt.

16. The buckle device of claim 12, wherein the gear train is a spur gear train.

17. The buckle device of claim 12, wherein the gear train is a bevel gear train.

* * * * *